United States Patent [19]

Sun

[11] Patent Number: 4,464,697

[45] Date of Patent: Aug. 7, 1984

[54] PROTECTIVE RELAY SYSTEM

[75] Inventor: Shan C. Sun, Coral Springs, Fla.

[73] Assignee: Westinghouse Electric Corp., Pittsburgh, Pa.

[21] Appl. No.: 397,758

[22] Filed: Jul. 13, 1982

[51] Int. Cl.³ .......................................... H02H 3/30
[52] U.S. Cl. ...................................... 361/64; 361/66; 361/68; 361/69
[58] Field of Search ................... 361/64, 66, 68, 69, 361/81

[56] References Cited

U.S. PATENT DOCUMENTS

| | | | |
|---|---|---|---|
| 2,144,493 | 1/1939 | Harder et al. | 361/81 |
| 2,376,752 | 5/1945 | Bostwick | 361/69 X |
| 3,983,455 | 9/1976 | Hinman, Jr. | 361/68 X |
| 4,056,838 | 11/1977 | Leib | 361/68 |

Primary Examiner—Harry E. Moose, Jr.
Attorney, Agent, or Firm—J. L. DeAngelis

[57] ABSTRACT

Protective relaying apparatus of the pilot type, incorporating a direct transfer trip function (DTT) which reliably and securely utilizes the same communication channel utilized by the pilot relaying function. The DTT function operates within the constraints of a PPM modem, utilizing a signal extracted from the carrier signal, to provide a perfectly synchronized tone for the DTT signal.

16 Claims, 5 Drawing Figures

PROTECTIVE RELAY SYSTEM

BACKGROUND OF THE INVENTION

1. Field of the Invention

The invention relates in general to protective relay systems for protecting high-voltage transmission line sections in a three-phase electrical power system.

2. Description of the Prior Art

U.S. Pat. No. 4,275,429, which is assigned to the same assignee as the present application, discloses a new and improved protective relay system which provides the functions of an electromechanical pilot-wire relay, without the necessity of having a continuous, metallic conductor connected between the points to be compared. This relay may use many different types of communication links, such as an optical link, microwave, power line carrier, or telephone channels. The telephone channel, for example, may be the dedicated, uniterruptible Bell Telephone System 3002 channel.

Copending application Ser. No. 339,031, filed Jan. 13, 1982, now U.S. Pat. No. 4,408,246, sets forth another embodiment of an evaluation function which may be used in the protective relay system disclosed in the hereinbefore mentioned U.S. patent. Copending application Ser. No. 239,917, filed Mar. 3, 1981, now U.S. Pat. No. 4,380,746 discloses a new and improved pulse modulator, which may be used in the modem of the relay of the hereinbefore mentioned U.S. patent.

Concurrently filed application Ser. No. 397,944, filed July 13, 1982, entitled "Demodulator", discloses a new and improved pulse demodulator which may be used in the modem of the relay system of the hereinbefore mentioned U.S. patent.

Direct transfer trip (DTT) is an important function in the application of protective relays, as it provides the capability of tripping a circuit breaker at a remote location, without supervision by fault detectors. It would be desirable to be able to add a DTT function to the protective relay system of U.S. Pat. No. 4,275,429 and application Ser. No. 339,031. To add the DTT function via a dedicated communication channel would be a simple task, but not economically attractive. From the economic viewpoint, it would be desirable to be able to utilize the same channel used by the protective relay. However, conventional techniques would greatly complicate the design. Thus, it would be desirable to add a DTT function to this protective relay system, using the communication channel of the protective relay, without resorting to an involved, complicated design, which would not only add cost, but it could adversely affect the dependability, reliability, and security of the relay system.

In a preferred embodiment of this pilot relay, pulse period modulation (PPM) is used, with preferred embodiments of the pulse modulator and pulse demodulator being set forth in the hereinbefore mentioned commonly assigned applications. This modem is suitable for any type of communication channel, including the hereinbefore mentioned 3002 telephone channel, even though the latter has a very limited usable bandwidth. For this application, the modem carrier frequency is chosen at 1.7 KHz with a maximum deviation of about ±200 Hz. There is minimum attenuation and envelope delay in this narrow frequency band. Thus, it would be desirable to add a DTT function to this protective relay system while using the modem described in the hereinbefore mentioned patent applications, if this can be accomplished without complicating or expanding the basic modem circuits.

SUMMARY OF THE INVENTION

Briefly, the present invention discloses a new and improved arrangement for adding the DTT function to the protective relay system of the hereinbefore mentioned U.S. patent and patent applications. This new and improved DTT arrangement uses the same channel interface, signal conditioning and processing means, PPM modulation, and demodulation, which elements are already in place for processing the 60 Hz modulating signal in the normal operation of the protective relay system. In effect, the improved arrangement "squeezes" the DTT function into the pilot protective relay system, without any change in the basic modem. In order to provide security and dependability of the DTT function, including preventing the normal protective relay signals from being interpreted as a DTT command, a DTT request applies the DTT command signal to the modulator, and it automatically disconnects the normal 60 Hz modulating signal from the modulator while the DTT command signal is being sent. This new modulating signal is extracted from the carrier signal itself. Thus, perfect synchronization is always maintained between the DTT command modulating tone or signal and the carrier which is being modulated. Obtaining the DTT signal from the carrier signal significantly simplifies the design of the filter and decoder circuits in the DTT receiver circuit, as beat and jitter, which can result when two unrelated signals are used, cannot be generated. In a preferred embodiment, a frequency of 400 Hz is used as the DTT modulating signal.

In addition to using a DTT command modulating signal having a frequency significantly different than the frequency of the power frequency modulating signal, the magnitude of the 400 Hz DTT command signal is selected, relative to the magnitude of the normal 60 Hz modulating signal, to produce a larger frequency deviation from the center frequency. For example, if the center frequency (no modulating signal) is 1.7 KHz, and the deviation is ±200 Hz for the 60 Hz modulating signal, the deviation is selected to be higher, such as ±200 Hz for the 400 Hz modulating signal. The demodulator will thus provide an output signal of greater magnitude, in response to the DTT command signal, than in response to the 60 Hz protective relay signal.

The DTT circuitry verifies that the signal is 400 Hz, such as with a 400 Hz bandpass filter, and it verifies that it has a larger magnitude than the normal 60 Hz modulating signal, such as with a level detector. The DTT detection circuitry further verifies the frequency of a signal which passes these tests, by producing a pulse train from the signal and applying it to a multivibrator which will only provide a continuous output when the pulse train has a rate associated with the 400 Hz signal. As a final test, the DTT detection circuitry includes timer means which has a predetermined timing interval initiated by an output of the multivibrator which indicates that the signal being received has the correct frequency. The DTT detection circuitry only provides a trip signal for the associated circuit breaker when this signal persists for the predetermined timing interval. The detection circuitry also produces signals during the timing interval which disable the normal relay trip signal processing circuitry.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
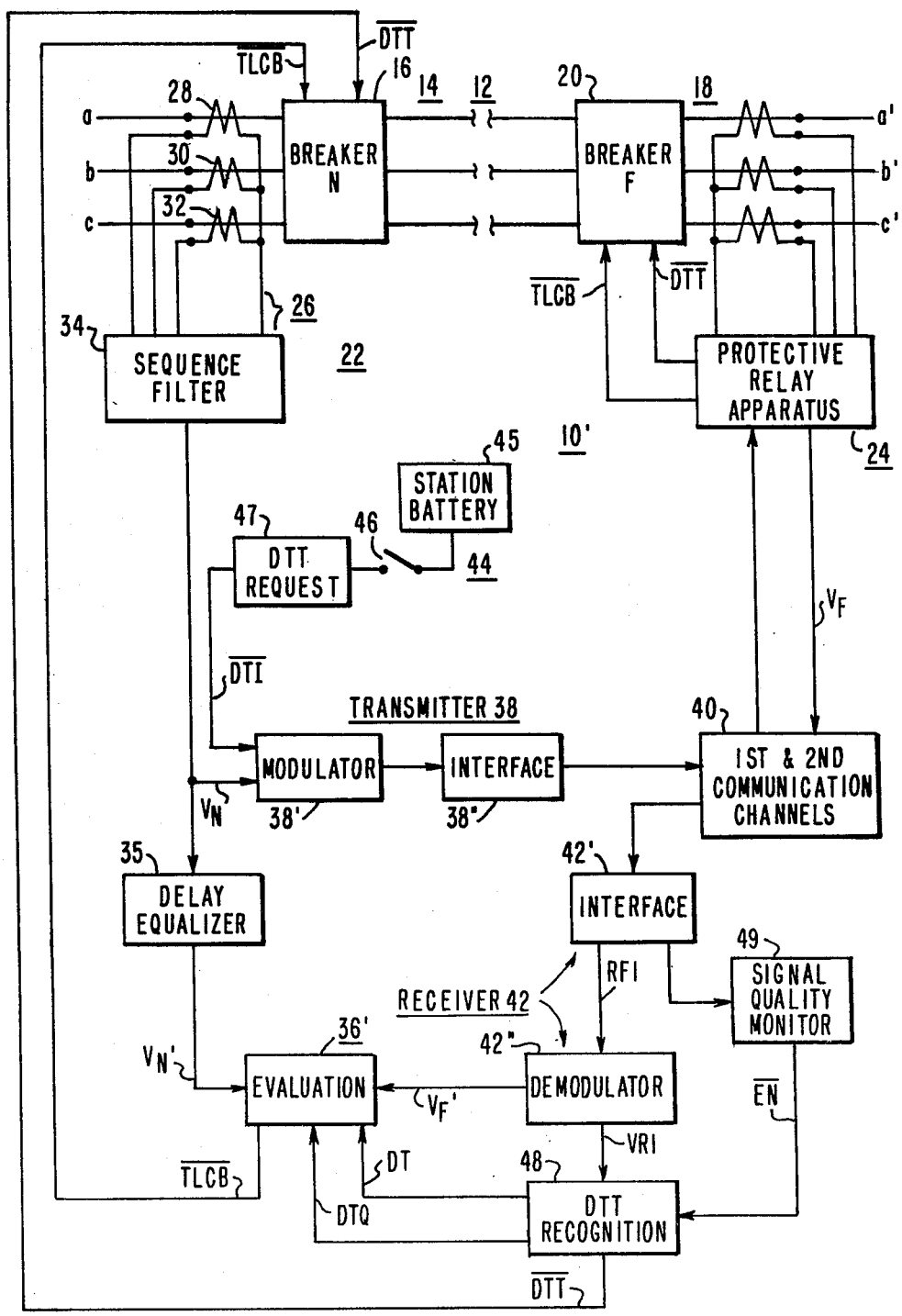
FIG. 1 is a schematic diagram of a protective relay system which may be constructed according to the teachings of the invention.

The present invention is a modification of the pilot protective relay system shown in the hereinbefore mentioned U.S. Pat. No. 4,275,429 and application Ser. Nos. 339,031; 239,917; and 397,944. In order to limit the length and complexity of the present application, this patent and patent applications are hereby incorporated into the specification of the present application by reference. Only the portions of the incorporated protective relay system which are necessay in order to understand the present invention are repeated herein. The reference numerals of the repeated portions have been retained in FIG. 1. Portions from the incorporated system which have been modified in FIG. 1, are identified with their prior reference numerals plus a prime (') mark.

Referring now to the drawings, and to FIG. 1 in particular, there is shown a new and improved protective relay system 10' for providing pilot protection for a transmission line section 12. The protected section 12 may be a two or a three terminal line, with a two terminal line being shown for purposes of example. Transmission line section 12 includes a local or near terminal 14, which includes a circuit breaker 16. Circuit breaker 16 interconnects one end of line section 12 with a high-voltage, three-phase, a.c. electrical power system having conductors a, b, and c. Transmission line section 12 further includes a first remote or far terminal 18 which includes a circuit breaker 20. Circuit breaker 20 interconnects another end of line section 12 with a high-voltage, three-phase a.c. electrical power system having conductors a', b', and c'.

Terminals 14 and 18 additionally include similar protective relaying apparatus 22 and 24, respectively. Since the protective relaying apparatus 22 and 24 at each terminal may be similar, only the protective relaying apparatus 22 associated with the near terminal 14 will be described in detail.

Protective relaying apparatus 22 includes means 26 for obtaining a protective relay signal, such as a current derived single-phase composite sequence voltage signal $V_N$ responsive to the three-phase currents flowing in conductors a, b, and c, and the $3I_0$ or ground current. Means 26 includes current transformers 28, 30 and 32, and a composite sequence filter 34 which mixes predetermined percentages of positive, negative and/or zero sequence currents from the three phases to obtain a power frequency, e.g., 60 Hz, single-phase composite sequence voltage whose phase is responsive to the direction of power flow, and whose magnitude is responsive to the current magnitudes in the three phases. The same composite sequence filter now used by the prior art electromechanical pilot-wire relays may be used, with U.S. Pat. No. 2,183,646 describing a composite sequence filter which may be used; or the composite sequence filters may be solid state, constructed of operational amplifiers.

The current derived composite sequence signal or voltage $V_N$ is applied to a transmitter 38. Transmitter 38 includes a modulator 38' and a communication interface 38" for the type of communication link utilized. The waveform of voltage signal $V_N$ is used as the modulating waveform in modulator 38' for the type of communication selected for transmitter 38. For example, transmitter 38 may produce pulses at a predetermined nominal rate in response to a modulating signal of zero magnitude, with the pulse rate changing as signal $V_N$ changes from zero. Pulse period modulation is the preferred form of communication in the present invention, and the invention is accordingly described relative to this form of modulation. The center or nominal frequency may be chosen for the specific type of communication link 40 employed. Since the attenuation and envelope delay versus frequency will be known for the specific communication channel selected, the nominal pulse rate should be selected to minimize both attenuation and envelope delay. For example, in a dedicated uninterruptible Bell Telephone System 3002 channel, a narrow band of approximately ±300 Hz around a center frequency of approximately 1.7 KHz provides minimum attenuation and envelope delay. The present invention will be described assuming the use of the 3002 channel in the communication link 40.

Protective relaying apparatus 22 also includes a receiver 42 connected to the communication link 40, which includes an interface 42' for the specific type of communication link 40 utilized, and a demodulator 42". Demodulator 42" may be the PPM demodulator of the hereinbefore mentioned incorporated application. Receiver 42 receives a communication signal responsive to the power frequency, current derived, single-phase composite sequence voltage signal $V_F$ from the far terminal 18. Receiver 42 demodulates the communication signal to provide signal $V'_F$, which is similar to signal $V_F$, except delayed by the channel delay time.

Signal $V_N$ from sequence filter 34 is also applied to a delay equalizer 35, which provides a signal $V'_N$ which is similar to signal $V_N$, except delayed by the same time as the channel delay. Signals $V'_N$ and $V'_F$ are now in suitable form for direct comparison, and they are applied to an evaluation circuit 36' for this purpose.

For normal through current, i.e., no fault in the protected transmission line section 12, and using the ct connections shown in FIG. 1, signal $V'_N$ will, ideally, be 180° out of phase with signal $V'_F$. When a fault occurs in the protected line section 12, current flow will be into the polarity marked terminals of the ct's and signals $V'_N$ and $V'_F$ will, ideally, be in phase.

The evaluation circuit 36', and its counterpart in protective relay apparatus 24, compare the single-phase voltage waveforms of the current derived signals $V'_N$ and $V'_F$, and if a fault is detected within the protected line section 12, trip signals TLCB are applied to their associated circuit breakers 16 and 18 to clear the transmission line section 12.

Figure 2:
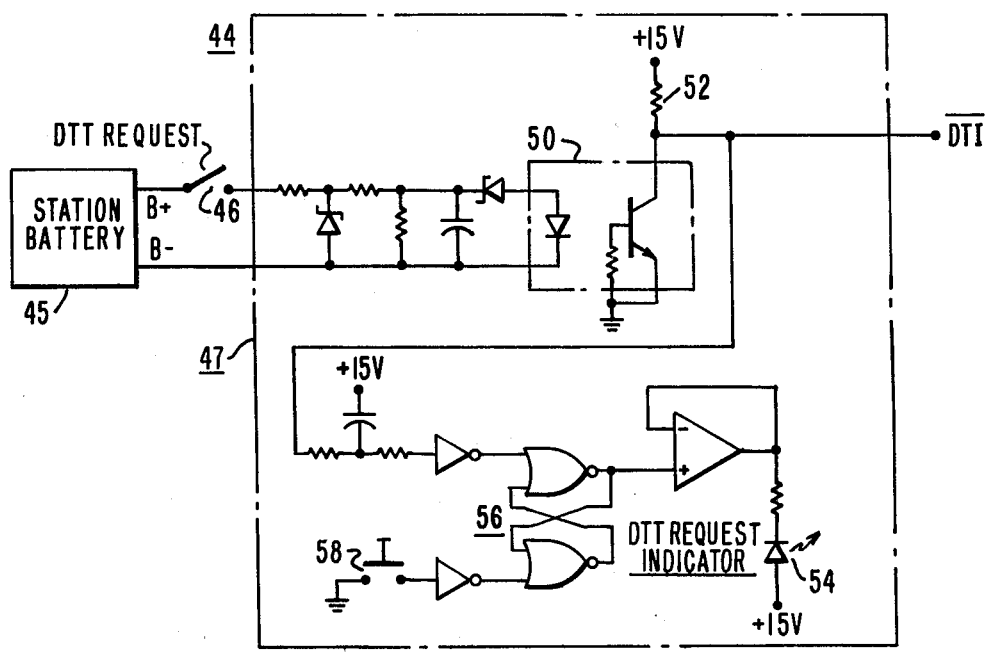
FIG. 2 is a schematic diagram of a direct transfer trip request function which may be used for this function shown in block form in FIG. 1.

A direct transfer trip request for tripping circuit breaker 20 is initiated at the near terminal 14 by means 44 which includes a source 45 of electrical potential, such as the station battery, a contact 46, and a DTT request function 47. Contact 46 may be manually actuated, or it may be under automatic control via appropriate protective relay circuitry. An exemplary implementation of the DTT request function 47 is shown in FIG. 2, and it will be hereinafter described. Modulator 38', as modified to respond to a true DTT initiation or request signal $\overline{DTI}$, is shown in detail in FIG. 3.

Figure 5:
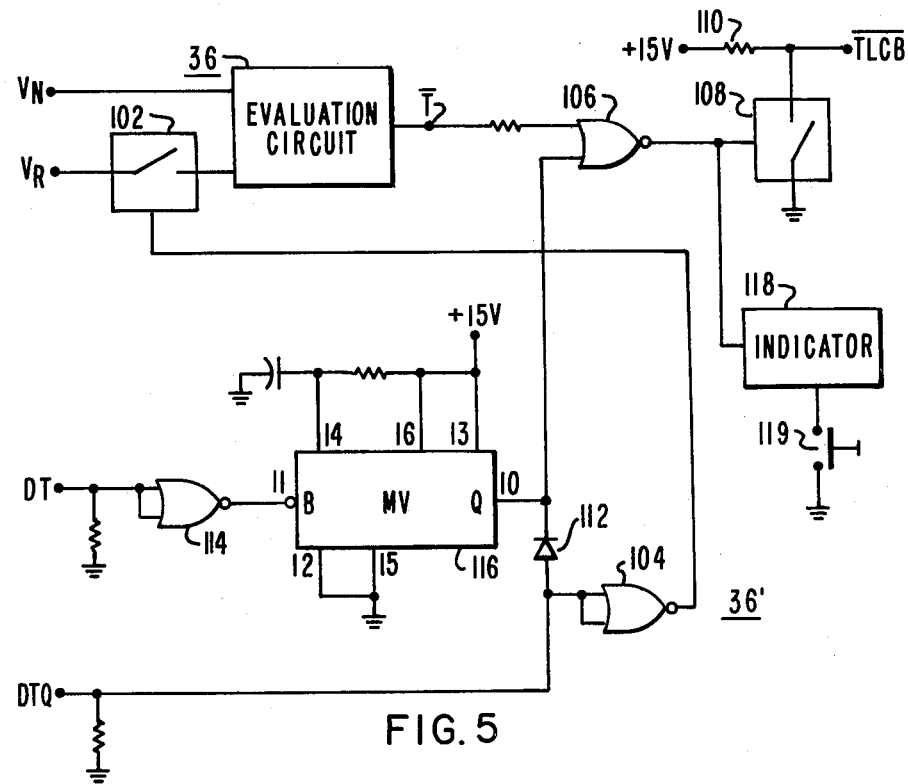
FIG. 5 is a schematic diagram illustrating modification of the normal relay functions, according to the teachings of the invention, while a direct transfer trip request is being processed.

DTT request means, similar to means 44, is provided at the remote terminal 18. When this remote request means enters a DTT request to direct the tripping of circuit breaker 16, the request is recognized by a DTT recognition function 48, which is shown in detail in FIG. 4. When function 48 detects a DTT request signal it provides signals DT and DTQ which modify the operation of the evaluation circuit 36'. This modification is set forth in detail in FIG. 5. When means 44 initiates a DTT request signal, DTT recognition means located at the remote terminal 18, which is similar to means 48, processes the request.

A signal quality monitor function 49 may monitor the incoming signal from the other terminal, or terminals, to determine if the signal quality is sufficiently good in order to enable the DTT function.

Referring now to FIG. 2, the DTT initiation or request function 47 may be provided by an LED-phototransistor package 50. When contact 46 is closed, to request a direct transfer trip of circuit breaker 20, the phototransistor is energized to connect output terminal $\overline{DTI}$ to ground. Terminal $\overline{DTI}$ is normally held high via a positive source of unidirectional potential and a resistor 52. When terminal $\overline{DTI}$ goes low, to provide a true $\overline{DTI}$ signal, it also energizes a DTT request indicator, which may include an LED 54. The request indicator is latched, such as by a flip-flop 56, until manually reset by a pushbutton 58.

Figure 3:
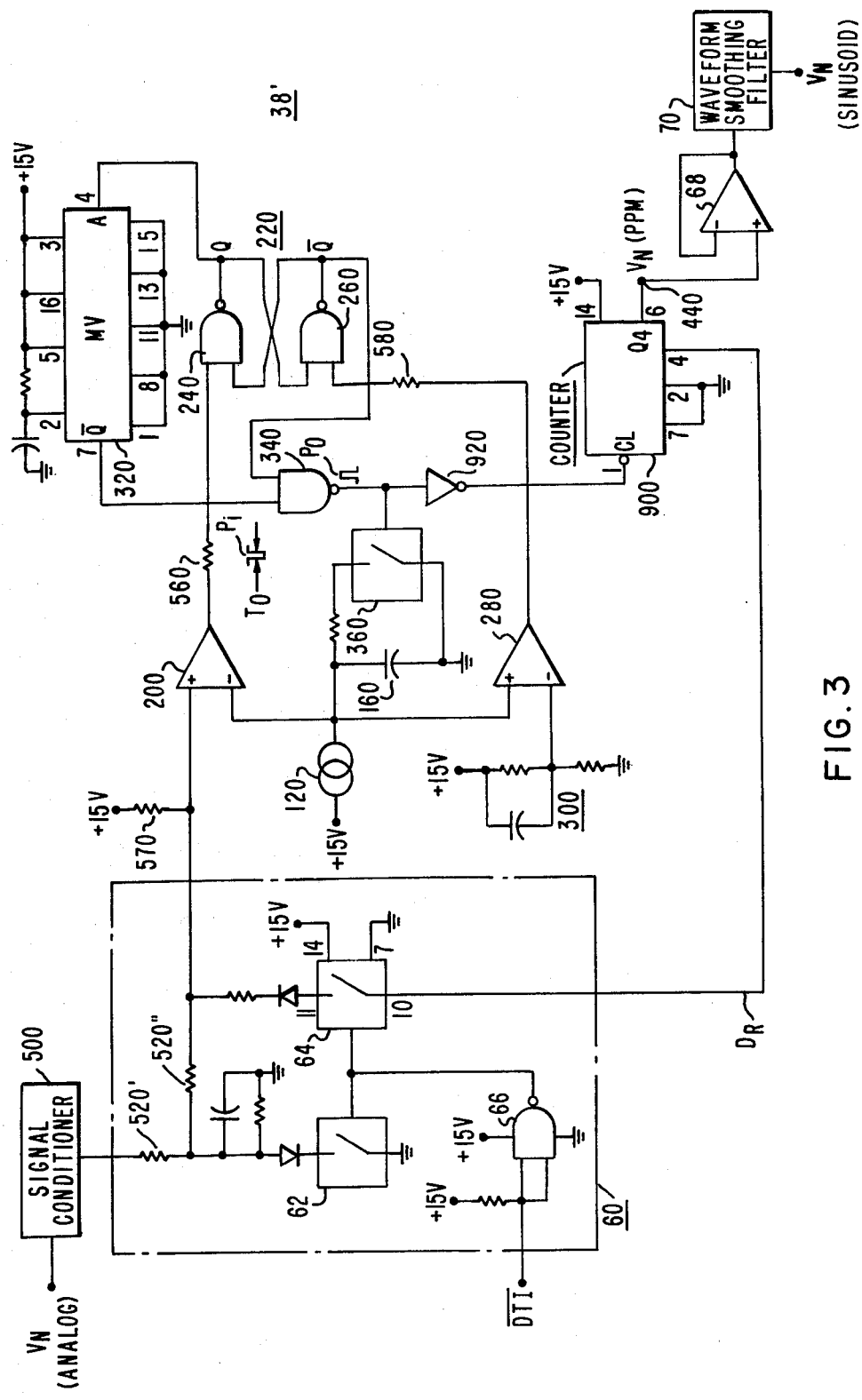
FIG. 3 is a schematic diagram illustrating a modification of the modulator shown in block form in FIG. 1, with the modification being in accordance with the teachings of the invention.

FIG. 3 is a schematic diagram of the modulator 38'. Except for the circuitry within the broken line 60, modulator 38' is as shown and described in incorporated application Ser. No. 239,917, and its basic operation has been unchanged. Since some of the reference numerals used in Ser. No. 239,917 have already been utilized, the reference numerals of Ser. No. 239,917 have been modified by adding a zero to each of them in FIG. 3.

When signal $\overline{DTI}$ goes low to request a direct transfer trip, circuitry 60 substitutes a DTT signal $D_R$ for the 60 Hz modulating signal $V_N$. Multivibrator 320 is designed to produce a pulse rate which will accommodate the carrier requirements of any type of communication link. A counter 900 is provided which is clocked by the pulses provided by multivibrator 320, with the outputs of counter 900 providing a plurality of different pulse rates which may be used as carrier signals. Signal $D_R$ is also obtained from one of the output terminals of counter 900, and signal $D_R$ is thus perfectly synchronized with the high frequency carrier applied to the clock input of the counter, and also perfectly synchronized with any of the other output terminals of counter 900 which may be selected to provide the carrier for the specific communication link to be utilized. An output of counter 900 is selected which will provide a frequency which is significantly different than the frequency of the protective relay signal $V_N$ or the signal $V_F$. Since these signals are at power frequency, an output of counter 900 may be selected, for example, which has a pulse rate which will provide an alternating signal having a frequency of about 400 Hz. The magnitude of signal $D_R$ is also controlled such that it will provide a slightly larger frequency deviation from the center frequency in the output of the modulator 38', than the deviation which results from the use of the 60 Hz signal $V_N$ as the modulating signal. For example, if the output at terminal 440 of modulator 38' is 1.7 KHz ±200 Hz for the signal $V_N$, the output may be chosen to be 1.7 KHz ±220 Hz for signal $D_R$.

Circuit 60 may include first and second bilateral switches 62 and 64, respectively, such as RCA's CD4066, which switches are controlled by signal $\overline{DTI}$. Circuit 60 also includes a NAND gate 66, connected as an inverter gate, and a source of unidirectional potential. When signal $\overline{DTI}$ is high, the output of gate 66 is low and both switches 62 and 64 are non-conductive. The modulator 38' operates in response to the 60 Hz modulation signal $V_N$ in this mode. When switch 46 shown in FIGS. 1 and 2 is closed, to request a DTT operation, signal $\overline{DTI}$ goes low, and the output of gate 66 goes high to render switches 62 and 64 conductive. Switch 62 now diverts signal $V_N$ to ground, and switch 64 connects the 400 Hz signal $D_R$ to the non-inverting input of op amp 200.

The pulse output $V_N$ (PPM) which appears at output terminal 440 is illustrated as being adapted for the hereinbefore mentioned telephone channel, with op amp 68 transforming the pulses into a squarewave, and filter 70 transforming the squarewave into a smooth sinusoid for transmission over the telephone channel.

Figure 4:
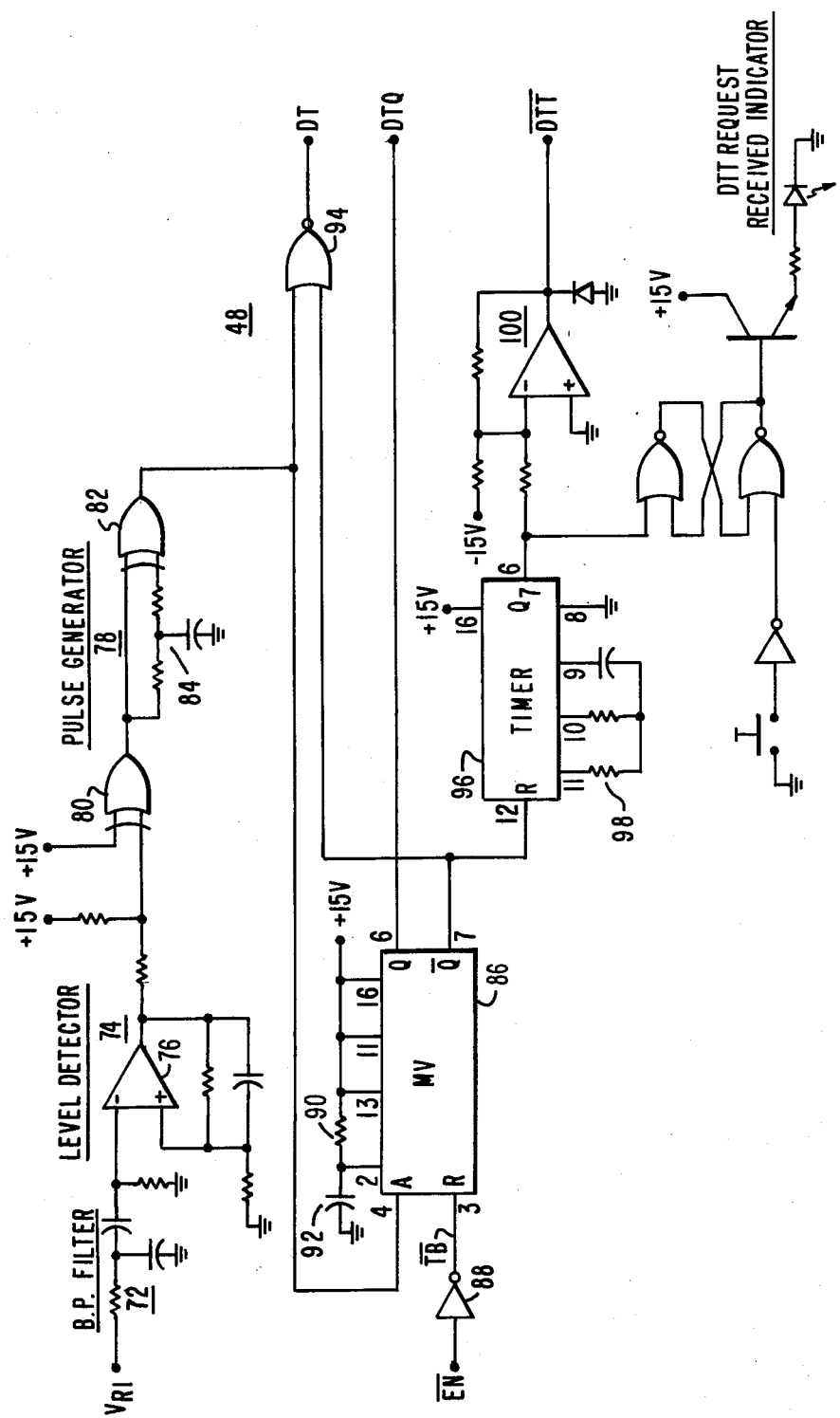
FIG. 4 is a schematic diagram illustrating a direct transfer trip recognition function, which function is shown in block form in FIG. 1, with the recognition function being constructed according to the teachings of the invention.

The DTT recognition function 48, shown in detail in FIG. 4, monitors the demodulator 42", being continuously on the alert for a DTT request which may be sent from a remote relaying point. A signal quality monitor 49 monitors the communication interface 42' to insure that the received signal quality is within acceptable limits. Concurrently filed application Ser. No. 397,753, entitled "Signal Quality Monitor For Protective Relay System" discloses a communication interface 42' which may be used for the 3002 telephone channel, and also a signal quality monitor function 49 which provides a low signal $\overline{EN}$ when the signal quality is within acceptable limits, and a high signal $\overline{EN}$ when it is not. This application is hereby incorporated into the present application by reference.

More specifically, DTT recognition function 48 monitors the demodulated signal VR1, and it applies several tests before verifying that a DTT request has been received. A first test verifies that the signal is in the frequency range of a true DTT request, i.e., 400 Hz. Another test, in series with the first test, verifies that a signal which passes the first test has a larger magnitude than the normal 60 Hz signal used in the protective relay function. A signal which passes these tests is then converted into a pulse train by suitable pulse means, and the pulse train is applied to a multivibrator. The multivibrator is arranged such that a pulse train having a rate associated with the frequency of the signal $D_R$ will continuously maintain the multivibrator in its triggered state. A final test monitors the triggered state of the multivibrator, and if it is continuously in its triggered state for a predetermined period of time, such as 12 ms, function 48 will then generate a low signal $\overline{\text{DTT}}$ for the trip circuit of circuit breaker 16. Circuit breaker 16 recognizes a low signal $\overline{\text{DTT}}$ as a request to trip the circuit breaker. Function 48, while processing a direct transfer trip request, provides a pulse train at an output terminal DT, and it provides a high output signal at an output terminal DTQ. Signals DT and DTQ from these terminals modify the operation of the evaluation circuit 36', as will be hereinafter described relative to FIG. 5.

The first or frequency test is performed by a 400 Hz tone detector or bandpass filter 72, which only passes a signal having a frequency in a narrow band about 400 Hz. If filter 72 passes a signal in this band, an amplitude test is performed on this band passed signal by a level detector function 74. Level detector function 74, for example, may include an op amp 76 connected as a level detector. Level detector function 74 is designed to reject signals having a magnitude indicative of the 60 Hz modulated signal, and to pass signals having a magnitude indicative of the 400 Hz modulated signal.

A pulse generator 78, which may be constructed of XOR gates 80 and 82 and an RC circuit 84, provides a pulse on each transition of a signal which passes the bandpass filter 72 and level detector 74. Thus, a 400 Hz signal $D_R$ will be converted to a pulse train having 800 pulses per second.

The output of gate 82 is applied to a retriggerable monostable multivibrator 86 (MV) such as one of the multivibrators in Motorola's dual package MC14538B. Signal $\overline{\text{EN}}$ from the signal quality monitor function 49 is applied to the reset input of MV 86 via an inverter gate 88. If signal $\overline{\text{EN}}$ is low, gate 88 applies a high signal $\overline{\text{TB}}$ to MV 86, enabling its operation. If signal $\overline{\text{EN}}$ is high, indicating the quality of the incoming signal is poor, gate 88 applies a low signal $\overline{\text{TB}}$ to MV 86, blocking its operation. Thus, a high signal $\overline{\text{EN}}$ will block a direct transfer trip.

MV 86, when enabled, performs another frequency test. Its Q and $\overline{\text{Q}}$ outputs are normally logic zero and logic one, respectively. If a pulse train is applied to its A input having a rate of 800 Hz, as selected by resistor 90 and capacitor 92, its $\overline{\text{Q}}$ output will be held low continuously, and the Q output will be high. The output of XOR gate 82 and the $\overline{\text{Q}}$ output of MV 86 are applied to the inputs of a NOR gate 94, and the output of gate 94 is connected to output terminal DT. Thus, when a DTT command is being processed a pulse train having a rate of 800 pulses per second is provided at output terminal DT. The Q output of MV 86 is connected to output terminal DTQ. Thus, when a DTT command is being processed, output terminal DTQ will be high.

The $\overline{\text{Q}}$ output of MV 86 is also connected to the reset input of a timer 96, which may be formed from RCA's CD4060B, which includes an oscillator section. An RC circuit 98 is provided which causes the $Q_7$ output of timer 96 to go high if its reset input R is held low for a predetermined period of time, such as 12 ms, which is the time selected to form the final test for the DTT command. If the DTT request meets the frequency and magnitude tests for 12 ms, the resulting high $Q_7$ output is applied to an inverting amplifier 100, which in turn switches its output to provide a low signal at output terminal $\overline{\text{DTT}}$. The low signal $\overline{\text{DTT}}$ is applied to the trip circuit of circuit breaker 16, to initiate a trip operation.

During the 12 ms test, the normal operation of the evaluation circuit 36' is modified by signals DT and DTQ. Signal $V_R$ from the remote relaying point is applied to the evaluation circuit 36 of the incorporated application Ser. No. 339,031 via a bilateral switch 102. Switch 102 is normally rendered conductive by the high output of a NOR gate 104, which has signal DTQ applied to its input. When a DTT request has been received and is being processed, signal DTQ goes high and the output of gate 104 goes low to disconnect signal $V_R$ from the evaluation circuit 36'. The 800 Hz rate pulse train DT produced when a DTT request is being processed, inhibits the normal relay trip circuit for a predetermined period of time. The trip signal T of incorporated application Ser. No. 339,031 is connected to an input of a NOR gate 106, whose output controls a bilateral switch 108. A terminal which provides trip signal $\overline{\text{TLCB}}$ is connected to one input of switch 108, and also to a source of unidirectional potential via a resistor 110. Output signal T is normally high, switch 108 is thus normally non-conductive, and terminal $\overline{\text{TLCB}}$ is held high. When switch 108 is rendered conductive, it connects output terminal $\overline{\text{TLCB}}$ to ground, providing a true signal $\overline{\text{TLCB}}$ which requests that circuit breaker 16 be tripped. An indicator 118 is latched when the output of gate 106 goes high to initiate a trip operation. A reset pushbutton 119 resets the indicator.

Signal DTQ is connected to the other input of NOR gate 106 via a diode 112. Signal DT is also connected to control this input to gate 106 via a NOR gate 114, connected as an inverter, and a monostable multivibrator 116 (MV), such as one of the MV's in Motorola's MC14538B package. Each time signal DT goes high it triggers a blocking signal for a predetermined period of time, such as 20 ms, by virtue of its Q output going high for the predetermined period of time. Either the high Q output of MV116, or the high signal DTQ, will block gate 106 from responding to signal T, maintaining switch 108 in a non-conductive state.

In summary, a DTT function has been added to the pilot relay system of the incorporated patent and patent applications, using the same channel used by the protective relay in its normal protective relaying function. This has been accomplished without adversely affecting reliability and security, and at little additional cost as little modification has been made to the basic relaying system. Further, the DTT function utilizes the PPM modem of the incorporated application, without complicating or changing the basic modem operating principles.

I claim as my invention:

1. A protective relay system for providing pilot protection for an alternating current transmission line section having at least first and second terminals, comprising:

first and second circuit interrupting means at the first and second terminals, respectively, to be protectively controlled;

means at the first and second terminals for providing first and second protective relay signals, respectively;

communication means including first transmitter means, a first communication channel, and a first receiver, for communicating the first protective relay signal from the first to the second terminal, and second transmitter means, a second communication channel, and second receiver means for communicating the second protective relay signal from the second to the first terminal, wherein said first transmitter means includes means for providing a carrier signal, and wherein the first protective relay signal modulates said carrier signal to produce a modulated first protective relay signal for transmission from the first to the second terminal;

means at each terminal for comparing the modulated first protective relay signal and the second protective relay signal, and for providing a trip signal for the associated circuit interrupting means when the comparison indicates a fault in the protected line section;

direct transfer trip means at at least the first terminal for initiating a request signal for a direct transfer trip of the second circuit interrupting means;

signal means providing a direct transfer trip signal in response to said request signal from said direct transfer trip means, wherein said signal means includes means for deriving said direct transfer trip signal from said means for providing said carrier signal, such that said direct transfer trip signal is synchronized with said carrier signal;

means substituting said direct transfer trip signal for said first protective relay signal, wherein said direct transfer trip signal modulates said carrier signal to produce a modulated direct transfer trip signal for transmission from the first to the second terminal with said first transmitter means and first communication channel communicating said direct transfer trip signal to said second receiver means at the second terminal;

and detecting means at said second terminal for detecting said modulated direct transfer trip signal, and for providing a trip signal for the second circuit interrupting means in response to such detection.

2. A protective relay system for providing pilot protection for an alternating current transmission line section having at least first and second terminals, comprising:

first and second circuit interrupting means at the first and second terminals, respectively, to be protectively controlled;

means at the first and second terminals for providing first and second protective relay signals, respectively;

communication means including first transmitter means, a first communication channel, and a first receiver, for communicating the first protective relay signal from the first to the second terminal, and second transmitter means, a second communication channel, and second receiver means for communicating the second protective relay signal from the second to the first terminal;

wherein said first transmitter means includes means for providing a pulsed carrier signal, and counter means responsive to said pulsed carrier signal having a plurality of output terminals which provide a plurality of pulsed signals which are divisions of said carrier signal;

means at each terminal for comparing the first and second protective relay signals, and for providing a trip signal for the associated circuit interrupting means when the comparison indicates a fault in the protected line section;

direct transfer trip means at at least the first terminal for initiating a request signal for a direct transfer trip of the second circuit interrupting means;

signal means providing a direct transfer trip signal in response to said request signal from said direct transfer trip means, wherein said signal means includes one of said output terminals of said counter means;

means substituting said direct transfer trip signal for said first protective relay signal, with said first transmitter means and first communication channel communicating said direct transfer trip signal to said second receiver means at the second terminal;

and detecting means at said second terminal for detecting said direct transfer trip signal, and for providing a trip signal for the second circuit interrupting means in response to such detection.

3. The protective relay system of claim 2 wherein the means substituting the direct transfer trip signal for the first protective relay signal includes first and second switch means whose conductive states are changed in response to the request signal from the direct transfer trip means, to respectively remove the first protective relay signal from the first transmitter means, and to apply the direct transfer trip signal to the first transmitter means.

4. The protective relay system of claim 2 wherein the first protective relay signal is an alternating signal having a first predetermined frequency, and the direct transfer trip signal is a alternating signal having a second predetermined frequency, which differs from the first predetermined frequency.

5. The protective relay system of claim 4 wherein the first protective relay signal has a first predetermined magnitude, and the direct transfer trip signal has a second predetermined magnitude, which differs from the first predetermined magnitude.

6. The protective relay system of claim 2 wherein the first protective relay signal has a first predetermined magnitude, and the direct transfer trip signal has a second predetermined magnitude, which differs from the first predetermined magnitude.

7. The protective relay system of claim 4 wherein the detecting means includes means for detecting the second predetermined frequency.

8. The protective relay system of claim 7 wherein the means for detecting the second predetermined frequency includes bandpass filter means and multivibrator means, with the multivibrator means outputting a predetermined signal indicative of receiving the direct transfer trip signal when a signal having a frequency associated with the direct transfer trip signal is applied thereto.

9. The protective relay system of claim 6 wherein the detecting means includes means for distinguishing between the different magnitudes of the first protective relay signal and the direct transfer trip signal.

10. The protective relay system of claim 6 wherein the magnitude of the direct transfer trip signal exceeds the magnitude of the first protective relay signal, and the detecting means includes level detecting means for rejecting signals having magnitudes indicative of the first protective relay signal and for passing signals having magnitudes indicative of the direct transfer trip signal.

11. The protective relay system of claim 5 wherein the detecting means includes means for detecting the second predetermined frequency, and means for distinguishing between the different magnitudes of the first protective relay signal and the direct transfer trip signal.

12. The protective relay system of claim 5 wherein the means for detecting the second predetermined frequency includes filter means and multivibrator means, with the multivibrator means outputting a predetermined signal indicative of receiving the direct transfer trip signal when a signal having a frequency associated with the direct transfer trip signal is applied thereto, and wherein the magnitude of the direct transfer trip signal exceeds the magnitude of the first protective relay signal, and the detecting means further includes level detecting means for rejecting signals having magnitudes indicative of the first protective relay signal, and for passing signals having magnitudes indicative of the direct transfer trip signal.

13. The protective relay system of claim 2 wherein the detecting means includes timer means having a predetermined timing interval initiated by the detection of the direct transfer trip signal, with the trip signal being provided only when the direct transfer trip signal persists for said predetermined timing interval.

14. The protective relay system of claim 2 wherein the first protective relay signal has a first predetermined frequency and first predetermined magnitude, the direct transfer trip signal has a second predetermined frequency and a second predetermined magnitude, which differ from the frequency and magnitude of the first protective relay signal, with the detecting means including frequency distinguishing means for rejecting signals of the first predetermined frequency and for passing signals of the second predetermined frequency, level detection means for rejecting signals passed by said frequency distinguishing means having a magnitude indicative of the first protective relay signal, and for passing signals passed by said frequency distinguishing means having a magnitude indicative of the direct transfer trip signal, and timer means having a predetermined timing interval initiated by a signal passed by said level detection means, with the trip signal being provided only when the predetermined signal provided by said level detection means persists for said predetermined timing interval.

15. The protective relay system of claim 2 wherein the first protective relay signal has a first predetermined frequency and a first predetermined magnitude, the direct transfer trip signal has a second predetermined frequency and a second predetermined magnitude, which differ from the frequency and magnitude of the first protective relay signal, with the detection means including frequency distinguishing means for rejecting signals of the first predetermined frequency and for passing signals of the second predetermined frequency, level detection means for rejecting signals passed by said frequency distinguishing means having a magnitude indicative of the first protective relay signal and for passing signals passed by said frequency distinguishing means having a magnitude indicative of the direct transfer trip signal, means converting a signal which passes the frequency distinguishing means and the level detection means to a pulse train having a rate associated with the frequency of said passed signal, multivibrator means responsive to said pulse train which provides a predetermined output signal only when the pulse rate of said pulse train is indicative of the second predetermined frequency, and timer means having a predetermined timing interval initiated by the predetermined output signal of the multivibrator means, with the trip signal being provided only when the predetermined signal provided by said multivibrator means persists for said predetermined timing interval.

16. A protective relay system for providing protection for an alternating current transmission line section having at least first and second terminals, comprising:
   first and second circuit interrupting means at the first and second terminals, respectively, to be protectively controlled,
   direct transfer trip means at at least the first terminal for providing a direct transfer trip signal for initiating a direct transfer trip of the second circuit interrupting means,
   communication means for communicating the direct transfer trip signal from the first to the second terminal,
   and detecting means at said second terminal for detecting said direct transfer trip signal,
   said detecting means including means combining signal tests related to frequency and magnitude, and the time duration of valid frequency and magnitude tests for any detected signal, with said means providing a trip signal for the second circuit interrupting means when such tests indicate a valid direct transfer trip signal has been received.

* * * * *